United States Patent [19]

Van Wynsberghe

[11] Patent Number: 5,584,506
[45] Date of Patent: Dec. 17, 1996

[54] FILTER ASSEMBLY FOR AN AIR BAG INFLATOR

[75] Inventor: Roy D. Van Wynsberghe, Mesa, Ariz.

[73] Assignee: TRW Inc., Lyndhurst, Ohio

[21] Appl. No.: 574,387

[22] Filed: Dec. 18, 1995

[51] Int. Cl.$^6$ .................................................. B60R 21/26
[52] U.S. Cl. ........................................... 280/741; 280/736
[58] Field of Search ................................... 280/736, 741, 280/742, 731; 102/530, 531, 202, 202.14; 222/3; 422/165

[56] References Cited

U.S. PATENT DOCUMENTS

| | | | |
|---|---|---|---|
| 4,943,086 | 7/1990 | Cunningham | 280/741 |
| 5,086,550 | 2/1992 | O'Loughlin et al. | 29/163.8 |
| 5,100,171 | 3/1992 | Faigle et al. | 280/736 |
| 5,189,255 | 2/1993 | Fukabori et al. | 102/531 |
| 5,273,311 | 12/1993 | Geisreiter | 280/736 |
| 5,318,323 | 6/1994 | Pietz | 280/736 |
| 5,335,940 | 8/1994 | Cuevas | 280/737 |

FOREIGN PATENT DOCUMENTS 0538863  4/1993  European Pat. Off. .............. 280/736

3021039  10/1993  WIPO ................................. 280/736

Primary Examiner—Christopher P. Ellis
Attorney, Agent, or Firm—Tarolli, Sundheim, Covell, Tummino & Szabo

[57] ABSTRACT

An air bag inflator (10) includes a housing (40) defining a combustion chamber (61) for providing inflation fluid for inflating an air bag. The housing (40) includes radially spaced side walls (50, 60) defining a filter chamber (140) disposed adjacent to the combustion chamber (61) for receiving inflation fluid from the combustion chamber. A filter assembly (150) is located in the filter chamber (140) for filtering inflation fluid flowing through the filter chamber. The filter assembly (150) includes a plurality of nested cylinders including outer and inner cylinders (160, 170). Each one of the outer and inner cylinders (160, 170) includes a plurality of tabs (180, 200) which engage an adjacent side wall (50, 60) of the housing (40) to maintain the cylinder in position in the filter chamber (140). Each tab (180, 200) comprises an area of the material of the cylinder (160, 170) projecting out of the cylinder and defining a fluid flow opening (182, 220) in the cylinder. The fluid flow openings (182, 220) define a tortuous path for inflation fluid to flow through the filter chamber (140).

16 Claims, 4 Drawing Sheets

5,584,506

FILTER ASSEMBLY FOR AN AIR BAG INFLATOR

BACKGROUND OF THE INVENTION

1. Technical Field

The present invention relates to an apparatus for inflating a vehicle occupant protection device, and particularly relates to an air bag inflator including a filter assembly.

2. Description of the Prior Art

It is known to help protect a vehicle occupant by an inflatable device, such as an air bag, that is inflated in response to sensing a condition indicative of a vehicle collision. The air bag is inflated by inflation fluid from an inflator. The inflation fluid may be gas which is generated by ignition of combustible gas generating material in the inflator. The inflator uses a filter assembly to cool and filter the gas produced by ignition of the gas generating material. A known filter assembly for an air bag inflator includes a slag screen and a final filter comprising a plurality of layers of various materials.

SUMMARY OF THE INVENTION

The present invention is an apparatus for inflating an inflatable vehicle occupant protection device, comprising a housing having an axis and defining a combustion chamber, and an inflation fluid source in the combustion chamber for providing inflation fluid for inflating the inflatable device. The housing includes radially spaced side walls defining a filter chamber disposed adjacent to the combustion chamber for receiving inflation fluid from the combustion chamber. The housing also includes fluid outlets for directing inflation fluid to flow from the filter chamber into the inflatable device. A filter assembly is located in the filter chamber for filtering inflation fluid flowing through the filter chamber. The filter assembly comprises a plurality of nested cylinders including first and second cylinders. Each one of the first and second cylinders includes a plurality of tabs which engage an adjacent side wall of the housing to maintain the cylinder in position in the filter chamber. Each one of the tabs comprises an area of the material of the cylinder projecting out of the cylinder and defining a fluid flow opening in the cylinder. The fluid flow openings define a fluid flow path for inflation fluid to flow through the filter chamber from the combustion chamber to the fluid outlets.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
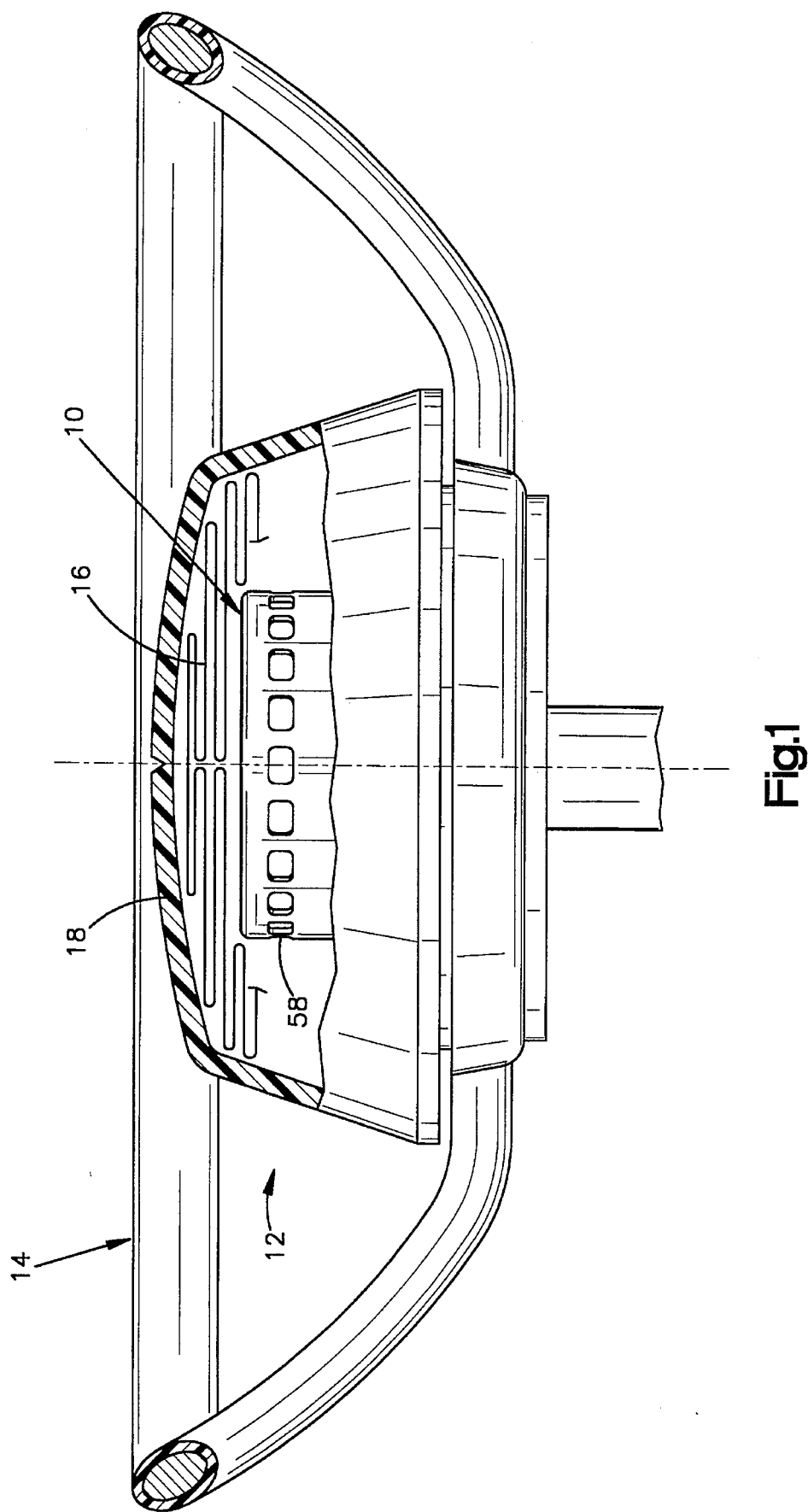
FIG. 1 is a schematic sectional view of a vehicle steering wheel assembly including an air bag module having an inflator constructed in accordance with the present invention.

The present invention relates to an apparatus for inflating an inflatable vehicle occupant protection device and, particularly, to an inflator for inflating an air bag to help protect the driver of a vehicle. The present invention is applicable to various air bag inflator constructions. As representative of the present invention, FIG. 1 illustrates an inflator 10.

The inflator 10 is included in an air bag module 12 which is mounted at the center of a vehicle steering wheel 14. The air bag module 12 also includes an inflatable device 16, commonly known as an air bag, which is folded and stored with the inflator 10 inside a cover 18.

The inflator 10 includes a housing 40. The housing 40 is made of three pieces, namely, a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around a central axis 52 of the inflator 10. The side wall 50 of the diffuser cup 42 has a cylindrical inner side surface 51 (FIG. 3) which is centered on and extends parallel to the central axis 52 of the inflator 10. The side wall 50 of the diffuser cup 42 extends between a flat upper end wall 54 and a flat lower flange 56. The end wall 54 and the flange 56 are generally parallel to each other and perpendicular to the axis 52. An annular array of gas outlet openings 58 is located in an upper portion of the diffuser cup side wall 50.

The upper end wall 54 of the diffuser cup 42 has a radially extending inner side surface 53. An inner annular surface 55 on the upper end wall 54 of the diffuser cup 42 defines a central opening 57 in the upper end wall 54.

The combustion cup 44 is generally cup-shaped and is disposed inside the diffuser cup 42. The combustion cup 44 has a cylindrical side wall 60 extending around the axis 52. The combustion cup 44 and the combustion chamber cover 46 define a cylindrical combustion chamber 61 disposed radially inward of the side wall 60 of the combustion cup. The side wall 60 of the combustion cup 44 has a cylindrical outer side surface 62 which is centered on and extends parallel to the central axis 52 of the inflator 10. An annular array of openings 68 is located in a lower portion of the combustion cup side wall 60.

The side wall 60 of the combustion cup 44 extends between a flat upper end wall 64 and a flat lower flange 66 of the combustion cup 44. The upper end wall 64 and the lower flange 66 of the combustion cup 44 are generally parallel to each other and perpendicular to the axis 52. The lower flange 66 of the combustion cup 44 has a radially extending inner side surface 67. The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion cup 42 and the diffuser cup 44 define a filter chamber 140 in the inflator 10. The outer side surface 62 of the side wall 60 of the combustion cup 42 defines the radially inner periphery of the filter chamber 140. The inner side surface 51 of the side wall 50 of the diffuser cup 44 defines the radially outer periphery of the filter chamber 140. The upper end wall 54 of the diffuser cup 42 and the lower flange 66 of the combustion cup 44 define the axially upper and lower peripheries, respectively, of the filter chamber 140.

The filter chamber 140 is located radially outward of the combustion chamber 61. The filter chamber 140 has a generally annular configuration centered on the axis 52 and encircles the combustion chamber 61. The openings 68 in the lower portion of the combustion cup side wall 60 place the filter chamber 140 in fluid communication with the combustion chamber 61. The gas outlet openings 58 in the upper portion of the diffuser cup side wall 50 place the filter chamber 140 in fluid communication with the interior of the air bag 16.

Figure 2:
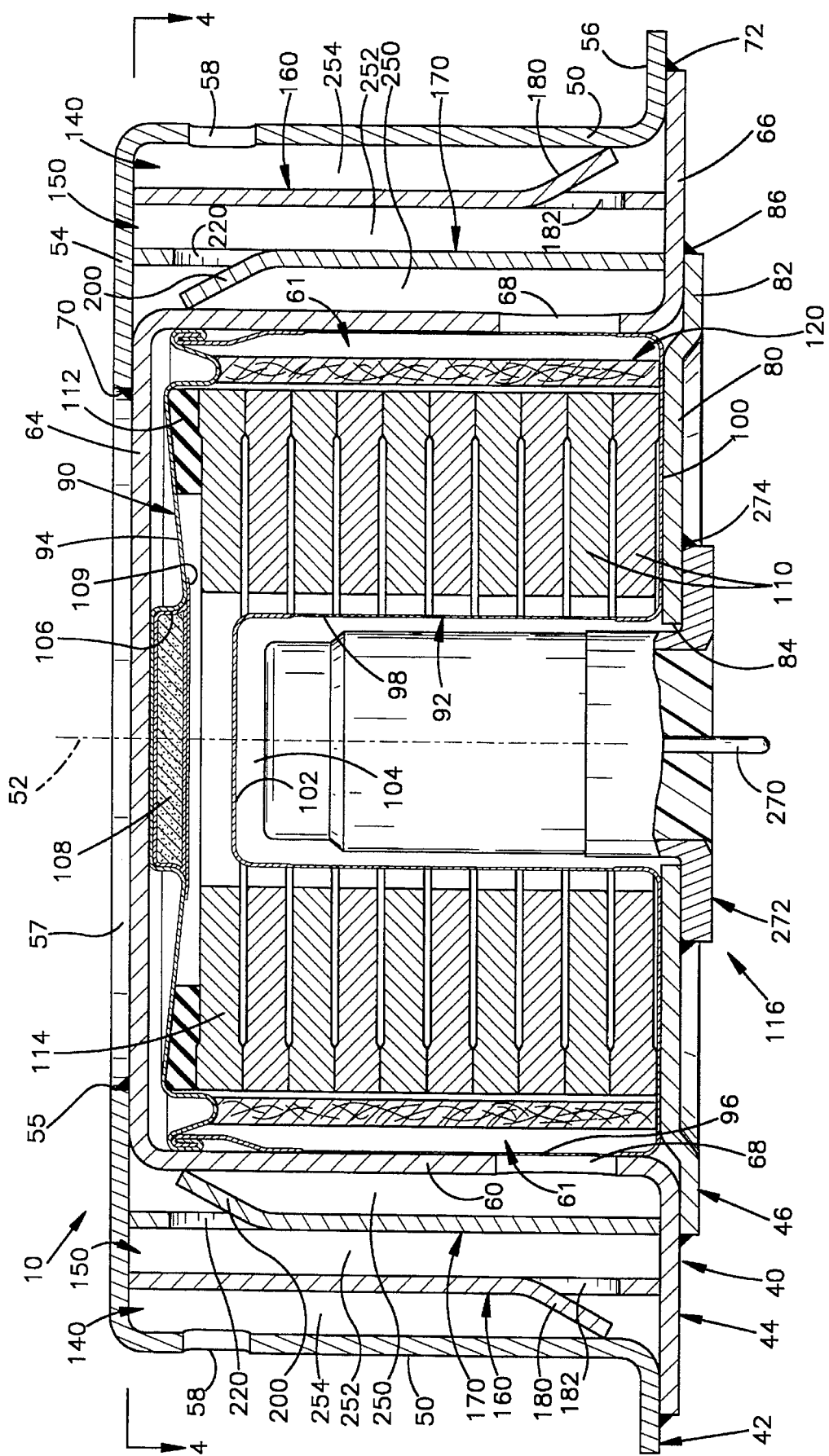
FIG. 2 is a sectional view of the inflator of FIG. 1.

The combustion chamber cover 46 (FIG. 2) is a generally flat metal piece having a circular center portion 80 and a parallel but slightly offset circular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion chamber 61 in the combustion cup 44. The canister 90 is made of two pieces, namely a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in an area adjacent an initiator 116.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and is held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which, when ignited, generates inflation fluid in the form of gas for inflating the air bag 16. Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

Figure 5:
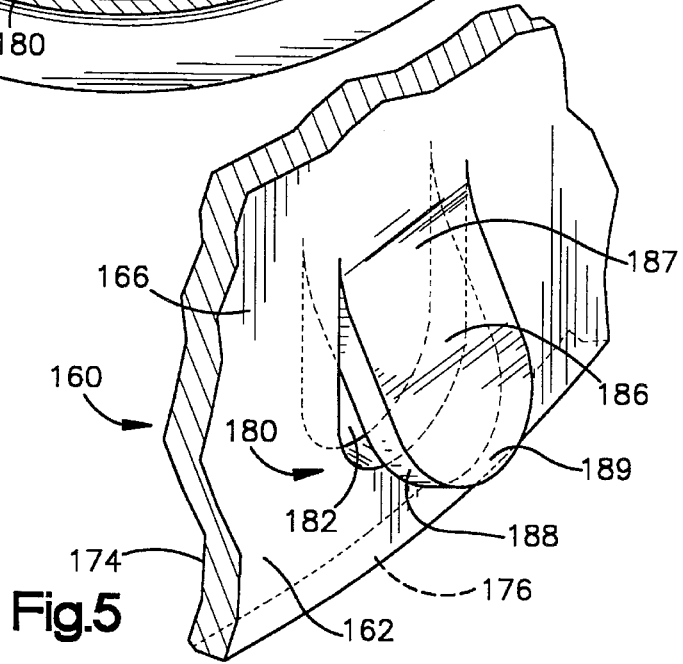
FIG. 5 is an enlarged perspective view of a portion of the filter assembly of the inflator of FIG. 1.

The initiator 116 (FIG. 2) of the inflator 10 includes at least one conductor pin or terminal 270. The initiator 116 also includes a retainer 272 (FIGS. 2 and 5), which is preferably made from machined or metal injection molded 304L stainless steel. The initiator 116 is attached to the combustion chamber cover 46, preferably by welding the retainer 272 to the cover 46 at a circumferential weld location 274. The cover 46 is then welded to the combustion cup 44 at a circumferential weld location 86. The initiator 116 is thereby secured in position in the inflator 10.

A filter assembly 150 is located in the filter chamber 140 in the inflator 10. The filter assembly 150 includes an outer cylinder 160 and an inner cylinder 170 which are coaxial and which are nested in the filter chamber 140. The cylinders 160 and 170 extend in the filter chamber 140 circumferentially around the combustion chamber 61.

The outer cylinder 160 has a cylindrical configuration centered on the axis 52 and is made from metal, preferably stainless steel. The outer cylinder 160 is smaller in diameter than the side wall 50 of the diffuser cup 42 but larger in diameter than the side wall 60 of the combustion cup 44. A main body portion 162 of the outer cylinder 160 has parallel, axially extending, cylindrical inner and outer side surfaces 164 and 166, respectively. An upper (as viewed in FIG. 3) axial end portion 168 of the main body portion 162 has a radially extending upper end surface 172. A lower axial end portion 174 of the main body portion 162 has a radially extending lower end surface 176.

The outer cylinder 160 includes a plurality of outer tabs 180 (FIGS. 3–5) which are identical to each other. The outer tabs 180 are disposed adjacent to the lower axial end portion 174 of the main body portion 162 of the outer cylinder 160. The outer tabs 180 are disposed in a circular array centered on the axis 52 and are equally spaced around the axis. In the illustrated embodiment, the outer cylinder 160 includes eight outer tabs 180, spaced apart in 45° increments around the axis 52. It should be understood that more than eight, or fewer than eight, outer tabs 180 can be provided.

Each outer tab 180 comprises an area or portion of the material of the main body portion 162 of the outer cylinder 160 which is bent out of, or projects from, the outer cylinder and which provides an outer opening 182 in the outer cylinder. Each outer tab 180 projects radially outward from the main body portion 162 of the outer cylinder 160 and axially downward, that is, in a direction toward the lower flange 66 of the combustion cup 44.

Each outer tab 180 has a radially inner side surface 184 and an opposite radially outer side surface 186. Each outer tab 180 extends axially between a base portion 187 and a projecting end portion 189. Each outer tab 180 has an outer peripheral surface 188 that extends between the radially inner and outer side surfaces 184 and 186. Each outer tab 180 also has an edge or corner 190 formed at the location of intersection of the outer side surface 186 and the outer peripheral surface 188.

The outer openings 182 formed by the outer tabs 180 extend between the inner side surface 164 and the outer side surface 166 of the main body portion 162 of the outer cylinder 160. The outer openings 182 in total are relatively small in flow area, as compared to the overall surface area of the main body portion 162 of the outer cylinder 160.

The filter assembly 150 is located in the filter chamber 140 so that the outer cylinder 160 engages the side wall 50 of the diffuser cup 42. Specifically, the edges 190 of the outer tabs 180 engage the inner side surface 51 of the side wall 50 of the diffuser cup 42. Because the outer tabs 180 project radially outward from the main body portion 162 of the outer cylinder 160, the outer tabs maintain the main body portion of the outer cylinder at a location spaced apart radially inward from the side wall 50 of the diffuser cup 42. The dimensions of the outer cylinder 160 are selected so that the outer tabs 180 are deflected radially inward by a small amount from their free position, to maintain the outer cylinder 160 resiliently in position relative to the side wall 50 of the diffuser cup 42.

In addition, the axial length of the outer cylinder 160, that is, the distance between the axial end surfaces 172 and 176, is selected so that the outer cylinder is in an interference fit between the end wall 54 of the diffuser cup 42 and the lower flange 66 of the combustion cup 44. Specifically, the end surface 172 of the outer cylinder 160 engages the inner side surface 53 of the end wall 54 of the diffuser cup 42. The end surface 176 of the outer cylinder 160 engages the inner side surface 67 of the lower flange 66 of the combustion cup 44. The interference fit of the outer cylinder 160 between the end wall 54 of the diffuser cup 42 and the lower flange 66 of the combustion 44, and the engagement between the outer tabs 180 and the side wall 50 of the diffuser cup, maintain the outer cylinder fixed in position in the filter chamber 140.

The inner cylinder 170 is smaller in diameter than the outer cylinder 160 and is nested within the outer cylinder. The inner cylinder 170 is smaller in diameter than the side wall 50 of the diffuser cup 42 and larger in diameter than the side wall 60 of the combustion cup 44. The inner cylinder 170 has a cylindrical configuration centered on the axis 52 and is made from metal, preferably stainless steel. A cylindrical main body portion 202 of the inner cylinder 170 includes parallel, axially extending, cylindrical inner and outer side surfaces 204 and 206. The upper axial end portion 208 of the inner cylinder 170 has a radially extending upper end surface 210. An opposite lower axial end portion 212 of the inner cylinder 170 includes a radially extending, lower end surface 214.

The inner cylinder 170 includes a plurality of inner tabs 200 which are identical to each other and which are disposed in a circular array centered on the axis 52. The inner tabs 200 are equally spaced around the axis 52. The inner tabs 200 are disposed adjacent to the upper axial end portion 208 of the main body portion 202 of the inner cylinder 170. In the illustrated embodiment, the inner cylinder 170 includes eight inner tabs 200 which are spaced apart in 45° increments around the axis 52. It should be understood that more than eight, or fewer than eight, inner tabs 200 can be provided on the inner cylinder 170.

Each inner tab 200 comprises an area or portion of the material of the main body portion 202 of the inner cylinder 170 which is bent out of, or projects from, the inner cylinder and which provides an inner opening 220 in the inner cylinder. The inner tabs 200 project axially from the main body portion 202 in an upward direction as viewed in FIG. 3, that is, toward the upper end wall 54 of the diffuser cup 42. The inner tabs 200 also project radially inward from the main body portion 202 of the inner cylinder 170.

Each inner tab 200 has a radially inner side surface 222 and a radially outer side surface 224. Each inner tab 200 also has an outer peripheral surface 226 that extends between the radially inner and outer side surfaces 222 and 224. An edge or corner 228 is formed at the intersection of the inner side surface 222 and the outer peripheral surface 226 of each inner tab 200.

The inner openings 220 formed by the inner tabs 200 extend between the inner side surface 204 and the outer side surface 206 of the main body portion 202 of the inner cylinder 170. The inner openings 220 in total are relatively small in flow area, as compared to the overall surface area of the main body portion 202 of the inner cylinder 170.

The inner cylinder 170, when in the filter chamber 140, engages the side wall 60 of the combustion cup 44. Specifically, the edges 228 of the inner tabs 200 of the inner cylinder 170 engage the outer side surface 62 of the side wall 60 of the combustion cup 44. Each inner tab 200 is resiliently deflected slightly radially outward from its free position projecting from the main body portion 202 of the inner cylinder 170. The inner tabs 200 maintain the main body portion 202 of the inner cylinder 170 at a location spaced apart radially outward from the side wall 60 of the combustion cup 44.

In addition, the axial length of the inner cylinder 170, that is, the distance between the end surfaces 210 and 214, is selected so that the inner cylinder 170 is in an interference fit between the end wall 54 of the diffuser cup 42 and the lower flange 66 of the combustion cup 44. The upper end surface 210 of the inner cylinder 170 engages the inner side surface 53 of the end wall 54 of the diffuser cup 42. The lower end surface 214 of the inner cylinder 170 engages the inner side surface 67 of the lower flange 66 of the combustion cup 44. The interference fit of the inner cylinder 170 between the end wall 54 of the diffuser cup 42 and the lower flange 66 of the combustion cup 44, and the engagement between the inner tabs 200 of the inner cylinder and the side wall 60 of the combustion cup, maintain the inner cylinder fixed in position in the filter chamber 140 in the inflator 10. The inner cylinder 170 is disposed and maintained at a location spaced apart radially inward from the outer cylinder 160.

The outer cylinder 160 and the inner cylinder 170 divide the filter chamber 140 into three axially coextensive, radially spaced chamber portions 250, 252, and 254. Each of the filter chamber portions 250, 252, and 254 is annular in configuration and is centered on the axis 52. The first, or radially innermost, portion 250 of the filter chamber 140 is disposed between the side wall 60 of the combustion cup 44 and the main body portion 202 of the inner cylinder 170. The second, or central, portion 252 of the filter chamber 140 is disposed radially outward of the main body portion 202 of the inner cylinder 170 and radially inward of the main body portion 162 of the outer cylinder 160. The third, or radially outermost, portion 254 of the filter chamber 140 is disposed radially outward of the main body portion 162 of the outer cylinder 160 and radially inward of the side wall 50 of the diffuser cup 42.

The inner openings 220 formed by the inner tabs 200 of the inner cylinder 170 establish fluid communication between the first portion 250 of the filter chamber 140, which is disposed radially inward of the inner cylinder, and the second portion 252 of the filter chamber 140, which is disposed radially outward of the inner cylinder. The outer openings 182 formed by the outer tabs 180 of the outer cylinder 160 establish fluid communication between the second portion 252 of the filter chamber 140, which is disposed radially inward of the outer cylinder 160, and the third portion 254 of the filter chamber, which is disposed radially outward of the outer cylinder.

The terminals 270 of the initiator 116 are connected with vehicle electric circuitry (not shown), including a sensor such as an accelerometer, for receiving an electrical signal to actuate the initiator. As known in the art, the sensor senses a vehicle condition that indicates the occurrence of a vehicle collision. If the vehicle condition sensed by the sensor is above a predetermined threshold level, it indicates the occurrence of a collision having at least a predetermined threshold level of severity. The threshold level of collision severity is a level at which inflation of the air bag 16 is desired for protection of a vehicle occupant.

When the sensor senses that the vehicle condition is above the predetermined threshold level, the vehicle circuitry then provides a collision signal which is transmitted through the terminals 270 of the initiator 116. A resistance wire in the initiator 116 heats up and sets off ignition material which deflagrates a charge in the initiator. Deflagration of the charge forms hot combustion products which flow outwardly from the initiator 116 and rupture the inner top wall 102 and the inner side wall 98 of the canister 90. The hot gas from the initiator 116 ignites the disks 110 of gas generating material. The disks 110 of gas generating material rapidly produce a large volume of another hot gas.

The pressure of the gas acts on the cylindrical outer side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator 116 and of the gas generating disks 110. The prefilter 120 also cools the flowing gas. When the gas cools, molten products are plated onto the prefilter 120.

Figure 3:
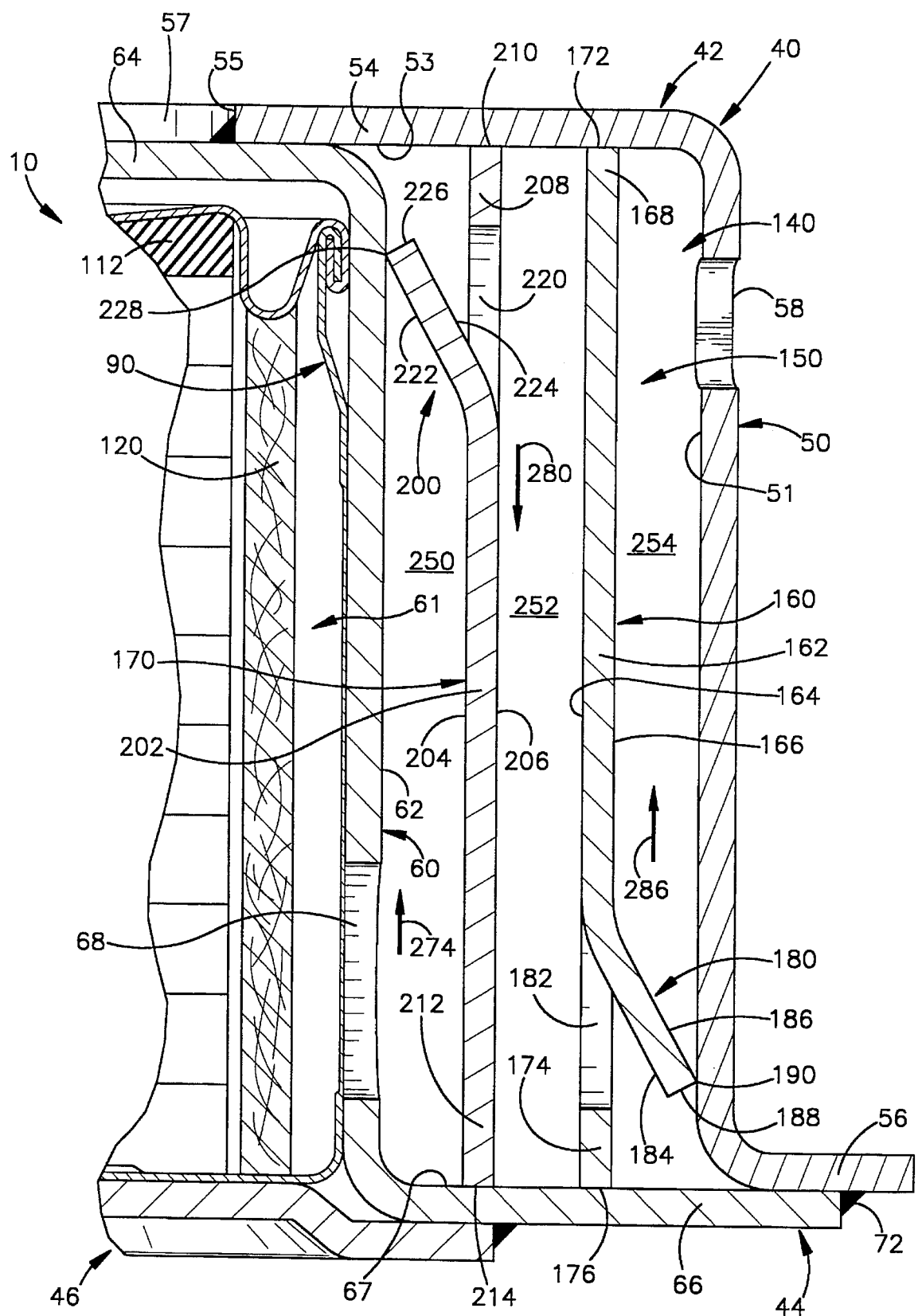
FIG. 3 is an enlarged view of a portion of the inflator of FIG. 2 including a portion of the filter assembly of the inflator.
Figure 4:
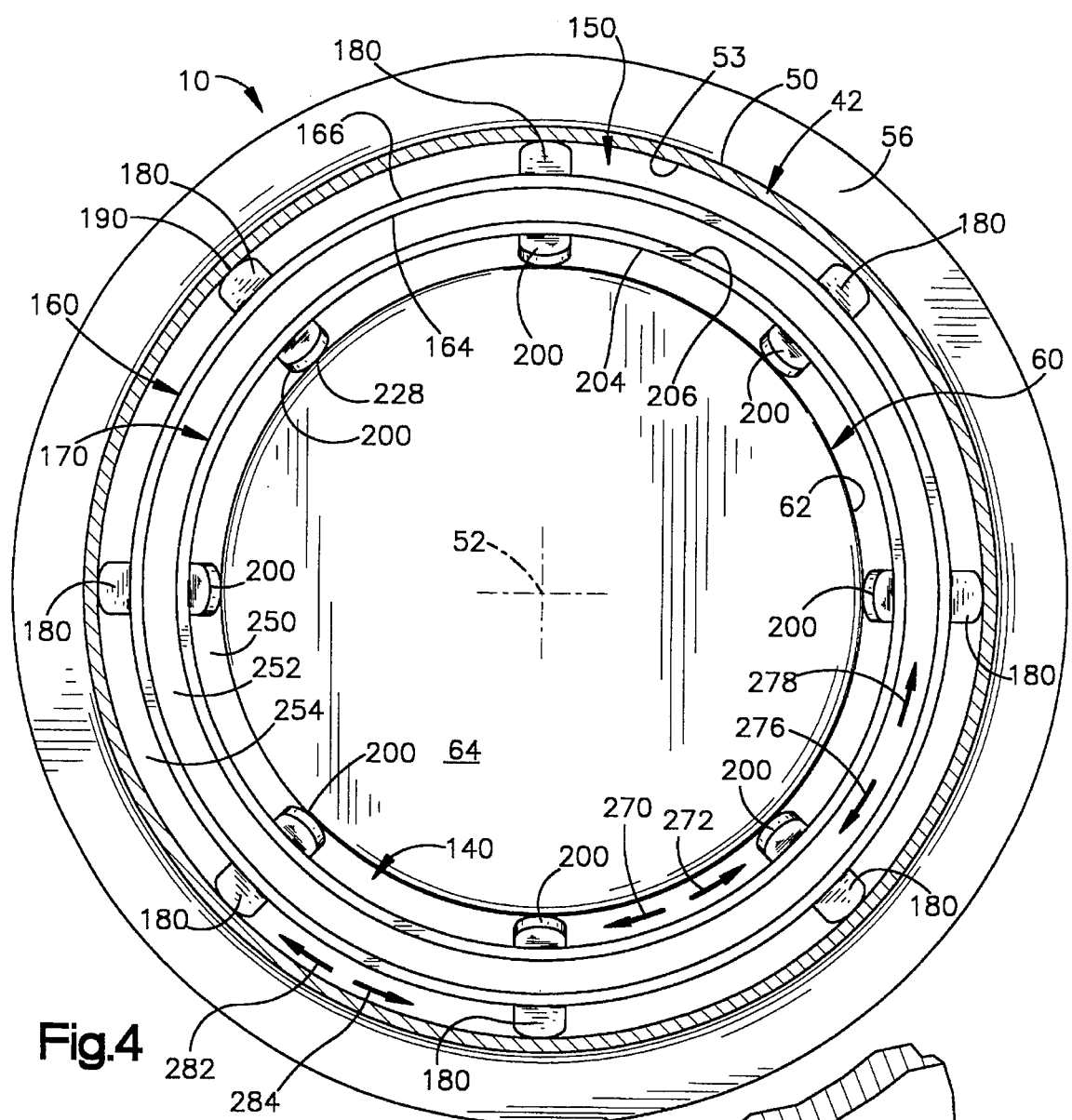
FIG. 4 is a view taken along line 4—4 of FIG. 2.

The hot gas from the combustion chamber 61 flows radially outwardly through the openings 68 in the side wall of the combustion cup 44 and into the filter chamber 140. The gas flowing through the openings 68 strikes the main body portion 202 of the inner cylinder 170 and changes direction to flow circumferentially and axially in the first portion 250 of the filter chamber 140. A first portion of this gas flows in one circumferential direction in the first portion 250 of the filter chamber 140, as indicated by the arrow 270 (FIG. 4). A second portion of this gas flows in the opposite circumferential direction in the first portion 250 of the filter chamber 140, as indicated by the arrow 272. The gas in the first portion 250 of the filter chamber 140 also flows axially from the openings 68 in a direction toward the inner openings 220 in the inner cylinder 170, as indicated by the arrow 274 (FIG. 3).

The gas in the first portion 250 of the filter chamber 140 then flows radially outwardly through the inner openings 220 in the inner cylinder 170 and into the second portion 252 of the filter chamber. A first portion of this gas flows in one circumferential direction in the second portion 252 of the filter chamber 140, as indicated by the arrow 276 (FIG. 4). A second portion of this gas flows in the opposite circumferential direction in the second portion 252 of the filter chamber 140, as indicated by the arrow 278. The gas in the second portion 252 of the filter chamber 140 also flows axially from the inner openings 220 in a direction toward the outer openings 182 in the outer cylinder 160, as indicated by the arrow 280 (FIG. 3).

The gas in the second portion 252 of the filter chamber 140 then flows radially outwardly through the outer openings 182 in the outer cylinder 170 and into the third portion 254 of the filter chamber 140. A first portion of this gas flows in one circumferential direction in the third portion 254 of the filter chamber 140, as indicated by the arrow 282 (FIG. 4). A second portion of this gas flows in the opposite circumferential direction in the third portion 254 of the filter chamber 140, as indicated by the arrow 284. The gas in the third portion 254 of the filter chamber 140 also flows axially from the outer openings 182 in a direction toward the outlet openings 58 in the side wall 50 of the diffuser cup 42, as indicated by the arrow 286 (FIG. 3). The gas in the third portion 254 of the filter chamber 140 then flows radially outwardly through the outlet openings 58 and thence into the air bag 16.

The filter assembly 150 filters the gas flowing from the combustion chamber 61 into the air bag. The initiator 116 and the gas generating material 110 can produce particulate and molten matter in the gas flowing out of the combustion chamber 61 through the openings 68. It is desirable to prevent this matter from passing into the air bag 16. To this end, the filter assembly 150 produces circumferential flow of gas in the several portions 250, 252 and 254 of the filter chamber 140 as described above. Centrifugal force acting on the gas flowing circumferentially in the first portion 250 of the filter chamber 140 causes particulate matter in the gas to move radially outwardly and collect on the cylindrical inner surface 204 of the inner cylinder 170. Centrifugal force acting on the gas flowing circumferentially in the second portion 252 of the filter chamber 140 causes particulate matter in the gas to move radially outwardly and collect on the cylindrical inner surface 164 of the outer cylinder 160. Also, centrifugal force acting on the gas flowing circumferentially in the third portion 254 of the filter chamber 140 causes particulate matter in the gas to move radially outwardly and collect on the cylindrical inner surface 51 of the side wall 50 of the diffuser cup 42.

The filter assembly 150 also cools the gas flowing into the air bag 16. Gas flowing out of the combustion chamber 61 may be relatively high in temperature. It is desirable to cool the gas before directing it into the air bag 16. In the inflator 10, the gas flows across a relatively large surface area of metal in the filter chamber 140, because of the tortuous path design of the various gas flow passages in the filter assembly 140, prior to flowing into the air bag 16. This cools the gas prior to its being directed into the air bag 16. As the gas cools, the molten matter in the gas plates onto the surfaces of the filter assembly 150.

Because the gas flowing through the filter chamber 140 is divided to flow in several different directions within the filter chamber, areas of turbulence are created in the filter chamber, adjacent the gas flow openings 68, 220, and 182. This turbulence slows the rate of gas flow into the air bag 16. The dimensions and configuration of the filter chamber 140 as well as the flow areas and locations of the radial openings 68, 220, 182, and 58, can be varied to control the rate of gas flow into the air bag and establish a desired pressure-time curve for air bag inflation.

From the above description of the invention, those skilled in the art will perceive improvements, changes and modifications in the invention. For example, the filter assembly could include more than two cylinders. Such improvements, changes and modifications within the skill of the art are intended to be covered by the appended claims.

Having described the invention, I claim:

1. An apparatus for inflating an inflatable vehicle occupant protection device, comprising:

a housing having an axis and defining a combustion chamber;

an inflation fluid source in said combustion chamber for providing inflation fluid for inflating the inflatable device;

said housing including spaced side walls defining a filter chamber disposed adjacent to said combustion chamber for receiving inflation fluid from said combustion chamber;

said housing including fluid outlets for directing inflation fluid to flow from said filter chamber into the inflatable device; and a filter assembly in said filter chamber for filtering inflation fluid flowing through said filter chamber;

said filter assembly comprising a plurality of nested cylinders including first and second cylinders, each one of said first and second cylinders including a plurality of tabs which engage an adjacent side wall of said housing to maintain said cylinder in position in said filter chamber, each one of said tabs comprising an area of the material of said cylinder projecting out of said cylinder and defining a fluid flow opening in said cylinder;

said fluid flow openings defining a fluid flow path for inflation fluid to flow through said filter chamber from said combustion chamber to said fluid outlets.

2. An apparatus as set forth in claim 1 wherein said first cylinder comprises an outer cylinder having a first, relatively large diameter and said second cylinder comprises an inner cylinder which has a second, relatively small diameter, said inner cylinder being coaxial with and disposed radially inward of said outer cylinder and at least partially axially overlapping said outer cylinder.

3. An apparatus as set forth in claim 2 wherein said inner cylinder includes a plurality of inner tabs defining a plurality of inner openings in said inner cylinder, said outer cylinder including a plurality of outer tabs defining a plurality of outer openings in said outer cylinder.

4. An apparatus as set forth in claim 3 wherein said inner tabs are disposed adjacent to a first axial end of said filter chamber and said outer tabs are disposed adjacent to a second axial end of said filter chamber opposite from said first axial end.

5. An apparatus as set forth in claim 3 wherein said inner cylinder and a first one of said spaced side walls of said housing at least partially define a first portion of said filter chamber, said first side wall of said housing having openings for directing inflation fluid to flow radially outward from said combustion chamber into said first portion of said filter chamber;

said inner cylinder and said outer cylinder at least partially defining a second portion of said filter chamber spaced radially outward of said first portion, said inner openings in said inner cylinder directing inflation fluid to flow radially outward from said first portion of said filter chamber into said second portion of said filter chamber;

said outer cylinder and a second one of said spaced side walls of said housing at least partially defining a third portion of said filter chamber spaced radially outward of said second portion, said outer openings in said outer cylinder directing inflation fluid to flow radially outward from said second portion of said filter chamber to said third portion of said filter chamber.

6. An apparatus as set forth in claim 5 wherein said inflation fluid in said first portion of said filter chamber flows in opposite circumferential directions in said first portion of said filter chamber and flows axially in a direction from openings in said first side wall of said housing to said inner openings in said inner cylinder, said inflation fluid in said second portion of said filter chamber flowing in opposite circumferential directions in said second portion of said filter chamber and flowing axially in a direction from said inner openings in said inner cylinder toward said outer openings in said outer cylinder, said inflation fluid in said third portion of said filter chamber flowing in opposite circumferential directions in said third portion of said filter chamber and flowing axially in a direction from said outer openings in said outer cylinder toward said fluid outlets in said housing.

7. An apparatus as set forth in claim 5 wherein said inner tabs on said inner cylinder extend between said inner cylinder and said first side wall of said housing and maintain said inner cylinder spaced apart from said first side wall of said housing, said outer tabs on said outer cylinder extending between said outer cylinder and said second side wall of said housing and maintaining said outer cylinder spaced apart from said second side wall of said housing.

8. An apparatus as set forth in claim 5 wherein each one of said inner tabs comprises a portion of the material of said inner cylinder which is bent out of said inner cylinder and which projects axially in a first direction from said inner cylinder, said inner openings in said inner cylinder having a relatively small flow area as compared to the overall surface area of said inner cylinder, each one of said outer tabs comprising a portion of the material of said outer cylinder which is bent out of said outer cylinder and which projects axially from said inner cylinder in a second direction opposite to said first direction, said outer openings in said outer cylinder having a relatively small flow area as compared to the overall surface area of said outer cylinder.

9. An apparatus for inflating an inflatable vehicle occupant protection device, comprising:

a housing having an axis and defining a combustion chamber;

an inflation fluid source in said combustion chamber for providing inflation fluid for inflating the inflatable device;

said housing including a radially inner side wall and a radially outer side wall at least partially defining a filter chamber disposed adjacent to said combustion chamber for receiving inflation fluid flowing from said combustion chamber;

said housing including fluid outlets for directing inflation fluid to flow from said filter chamber into the inflatable device; and a filter assembly in said filter chamber for filtering inflation fluid flowing through said filter chamber, said filter assembly comprising an outer cylinder having a first, relatively large diameter and an inner cylinder which is nested inside said outer cylinder and which has a second, relatively small diameter;

said inner cylinder having a generally cylindrical main body portion and a plurality of inner tabs which project radially inward from said main body portion and which engage said radially inner side wall of said housing, each one of said inner tabs comprising a respective portion of the material of said main body portion of said inner cylinder which projects from said main body portion to provide a respective inner opening in said main body portion of said inner cylinder;

said outer cylinder having a generally cylindrical main body portion and a plurality of outer tabs which project radially outward from said main body portion and which engage said radially outer side wall of said housing, each one of said outer tabs comprising a respective portion of the material of said main body portion of said outer cylinder which projects from said main body portion to provide a respective outer opening in said main body portion of said outer cylinder;

said inner openings in said main body portion of said inner cylinder and said outer openings in said main body portion of said outer cylinder defining a fluid flow path for inflation fluid to flow through said filter chamber from said combustion chamber to said fluid outlets.

10. An apparatus as set forth in claim 9 wherein said inner tabs on said inner cylinder maintain said main body portion of said inner cylinder spaced apart radially from said inner side wall of said housing, said outer tabs on said outer cylinder maintaining said main body portion of said outer cylinder spaced apart radially from said outer side wall of said housing.

11. An apparatus as set forth in claim 10 wherein said main body portion of said inner cylinder is spaced apart from said main body portion of said outer cylinder.

12. An apparatus as set forth in claim 11 wherein said inner side wall of said housing and said inner cylinder at least partially define an annular first portion of said filter chamber, said inner side wall of said housing having passages for directing inflation fluid to flow radially outward from said combustion chamber into said first portion of said filter chamber;

said inner cylinder and said outer cylinder at least partially defining an annular second portion of said filter chamber spaced radially outward of said first portion, said inner openings in said inner cylinder directing inflation fluid to flow radially outward from said first portion of said filter chamber into said second portion of said filter chamber;

said outer cylinder and said outer side wall of said housing at least partially defining an annular third portion of said filter chamber spaced radially outward of said second portion, said outer openings in said outer cylinder directing inflation fluid to flow radially outward from said second portion of said filter chamber to said third portion of said filter chamber.

13. An apparatus as set forth in claim 12 wherein said fluid outlets in said housing are formed in said outer side wall of said housing for directing inflation fluid to flow radially outward from said third portion of said filter chamber and thence into the inflatable device.

14. An apparatus as set forth in claim 10 wherein said housing further comprises first and second end walls extending between said side walls and at least partially defining said filter chamber, each one of said inner and outer cylinders having respective first and second axial portions which engage said first and second end walls, respectively, of said housing to substantially block flow of inflation fluid between said end portions of said cylinders and said end walls of said housing.

15. An apparatus as set forth in claim 14 wherein said inner tabs of said inner cylinder are located adjacent to said first end wall of said housing, said outer tabs of said outer cylinder being located adjacent to said second end wall of said housing.

16. An apparatus as set forth in claim 10 wherein each one of said inner tabs comprises a portion of the material of said main body portion of said inner cylinder which is bent out of said main body portion of said inner cylinder and which projects axially in a first direction from said main body portion of said inner cylinder, said inner openings in said inner cylinder having a relatively small flow area as compared to the overall surface area of said inner cylinder, each one of said outer tabs comprising a portion of the material of said main body portion of said outer cylinder which is bent out of said main body portion of said outer cylinder and which projects axially in a second direction opposite to said first direction from said main body portion of said inner cylinder, said outer openings in said outer cylinder having a relatively small flow area as compared to the overall surface area of said outer cylinder.

* * * * *